(12) United States Patent
Leleannec et al.

(10) Patent No.: US 10,939,108 B2
(45) Date of Patent: Mar. 2, 2021

(54) METHOD AND A DEVICE FOR IMAGE ENCODING AND DECODING

(71) Applicant: InterDigital VC Holdings, Inc., Wilmington, DE (US)

(72) Inventors: Fabrice Leleannec, Mouazé (FR); Tangi Poirier, Thorigné-Fouillard (FR); Fabrice Urban, Thorigne Fouillard (FR)

(73) Assignee: InterDigital VC Holdings, Inc, Wilmington, DE (US)

( * ) Notice: Subject to any disclaimer, the term of this patent is extended or adjusted under 35 U.S.C. 154(b) by 0 days.

(21) Appl. No.: 16/477,452

(22) PCT Filed: Dec. 27, 2017

(86) PCT No.: PCT/EP2017/084599
§ 371 (c)(1),
(2) Date: Jul. 11, 2019

(87) PCT Pub. No.: WO2018/130414
PCT Pub. Date: Jul. 9, 2018

(65) Prior Publication Data
US 2020/0045313 A1 Feb. 6, 2020

(30) Foreign Application Priority Data
Jan. 11, 2017 (EP) .............................. EP17305034.5

(51) Int. Cl.
*H04N 19/00* (2014.01)
*H04N 19/124* (2014.01)
(Continued)

(52) U.S. Cl.
CPC ......... *H04N 19/124* (2014.11); *H04N 19/176* (2014.11); *H04N 19/60* (2014.11)

(58) Field of Classification Search
CPC ........... H04N 7/00; H04N 11/00; H04N 19/00
See application file for complete search history.

(56) References Cited

U.S. PATENT DOCUMENTS 8,780,972 B2   7/2014  He et al.
2012/0189052 A1  7/2012  Karczewicz et al.
2016/0205404 A1* 7/2016  Zhu ..................... H04N 19/147
                                                375/240.03

FOREIGN PATENT DOCUMENTS

WO    2018065250 A1   4/2018

OTHER PUBLICATIONS

International Telecommunication Union, "Reference software for ITU-T H.265 High Efficiency Video Coding". Series H: Audiovisual and Multimedia Systems Infrastructure of Audiovisual Services, Coding of Moving Video, ITU-T Recommendation H.265.2, Oct. 2014, 12 pages.
(Continued)

*Primary Examiner* — Maryam A Nasri
(74) *Attorney, Agent, or Firm* — Invention Mine LLC

(57) ABSTRACT

A decoding method is disclosed that comprises: —decoding a block of transform coefficients from a bitstream; —dequantizing the decoded block of transform coefficients by a quantization step size; —scaling said dequantized block by a scaling factor; and —transforming said scaled block into an image block, wherein the scaling factor's value depends on whether at least one of the width and the height of the block is a power of 2.

24 Claims, 7 Drawing Sheets

(51) Int. Cl.
*H04N 19/176* (2014.01)
*H04N 19/60* (2014.01)

(56) References Cited

OTHER PUBLICATIONS

Budagavi, Madhukar, et. al., "Chapter 6: HEVC Transform and Quantization". High Efficiency Video Coding (HEVC): Algorithms and Architectures, (2014), pp. 141-169.
International Telecommunication Union, "High Efficiency Video Coding". Series H: Audiovisual and Multimedia Systems, Infrastructure of Audiovisual Services, Coding of Moving Video, ITU-T Recommendation H.265, Apr. 2015, 634 pages.
Suehring, Karsten, et. al., "JVET Common Test Conditions and Software Reference Configurations". Joint Video Exploration Team (JVET), SG16 WP3 and ISO/IEC JTC1/SC29/WG11, JVET-B1010, Mar. 29, 2016, pp. 1-4.
Chen, Jianle, et. al., "Algorithm Description of Joint Exploration Test Model 3". Joint Video Exploration Team (JVET), SG16 WP3 and ISO/IECJTC1/SC29/WG11/N16276, JVET-C1001_v3, Jun. 2016, 37 pages.
Budagavi, Madhukar, et. al., "Core Transform Design in the High Efficiency Video Coding (HEVC) Standard". IEEE Journal of Selected Topics in Signal Processing, vol. 7, No. 6, Dec. 2013, pp. 1029-1041.

\* cited by examiner

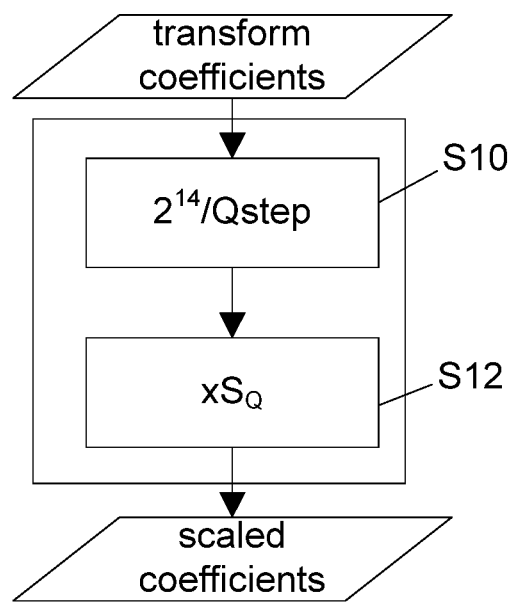
Figure 1 – Prior Art
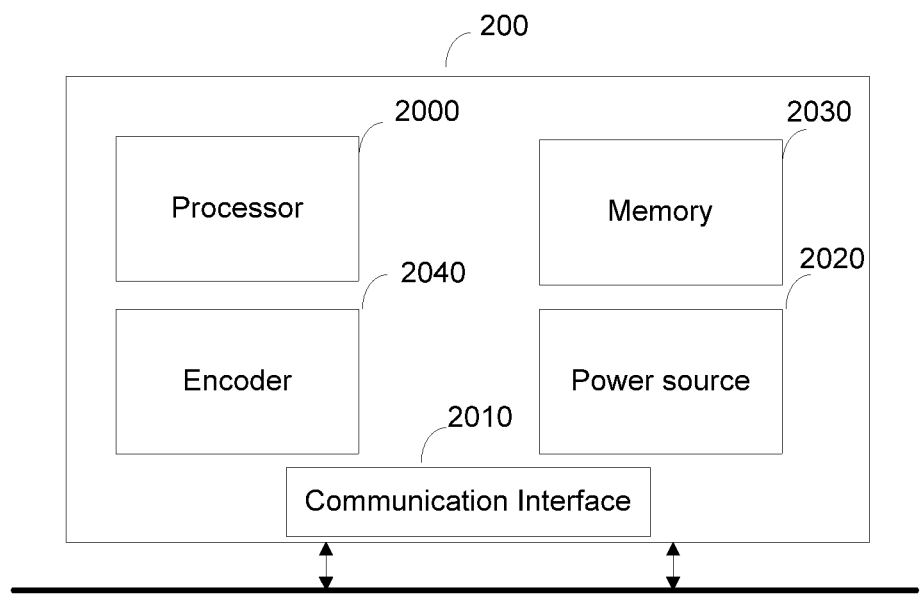
FIGURE 2

METHOD AND A DEVICE FOR IMAGE ENCODING AND DECODING

This application claims the benefit under 35 U.S.C. § 365 of International Application PCT/EP2017/084599, filed Dec. 27, 2017, which was published in accordance with PCT Article 21(2) on Jul. 19, 2018, in English, and which claims the benefit of European Patent Application No. 17305034.5, filed Jan. 11, 2017.

1. TECHNICAL FIELD

The present principles generally relate to a method and a device for image encoding and decoding, and more particularly, to a method and a device for image encoding and decoding with quantizing and inverse quantizing.

2. BACKGROUND ART

To achieve high compression efficiency, video coding schemes usually employ prediction and transform to leverage spatial and temporal redundancy in the video content. Generally, intra or inter prediction is used to exploit the intra or inter frame correlation, then the differences between group of samples in the original image and in the prediction image, often denoted as residuals, are transformed, quantized and entropy coded. To reconstruct the video, the compressed data is decoded by inverse processes corresponding to the prediction, transform, quantization and entropy coding.

In HEVC coding ("ITU-T H.265 Telecommunication standardization sector of ITU (April 2015), series H: audiovisual and multimedia systems, infrastructure of audiovisual services—coding of moving video, High efficiency video coding, Recommendation ITU-T H.265"), transform and quantization are applied on square blocks whose size in each dimension is equal to a power of 2, i.e. of size $2^M \times 2^M$. As depicted on FIG. 1, quantization comprises quantization by Qstep (S10) followed by scaling (S12) by a scaling factor $S_Q$ equal to $2^{-(29-M-B)}$, where B is the bitdepth of the original image. In an analogous way, de-quantization comprises de-quantization by Qstep followed by scaling by a scale factor $S_{IQ}$ equal to $S_{IQ}=2^{-(M+B-9)}$.

The HEVC quantization and scaling are only adapted to square blocks whose width and/or height are/is a power of 2.

3. BRIEF SUMMARY

A decoding method is disclosed that comprises:
- decoding a block of transform coefficients from a bitstream;
- de-quantizing the decoded block of transform coefficients by a quantization step size to obtain a dequantized block;
- scaling the dequantized block by a scaling factor to obtain a scaled block; and
- transforming the scaled block into an image block, wherein the scaling factor, i.e. its value, depends on whether at least one of the width and the height of the block is a power of 2.

A decoding device is disclosed that comprises:
- means for decoding a block of transform coefficients from a bitstream;
- means for de-quantizing the decoded block of transform coefficients by a quantization step size to obtain a dequantized block;
- means for scaling the dequantized block by a scaling factor to obtain a scaled block; and
- means for transforming the scaled block into an image block, wherein the scaling factor depends on whether at least one of the width and the height of the block is a power of 2.

A decoding device comprising a communication interface and at least one processor is disclosed. The communication interface is configured to access at least a bitstream and the at least one processor is configured to:
- decode a block of transform coefficients from the accessed bitstream;
- de-quantizing the decoded block of transform coefficients by a quantization step size to obtain a dequantized block;
- scaling the dequantized block by a scaling factor to obtain a scaled block; and
- transforming the scaled block into an image block, wherein the scaling factor depends on whether at least one of the width and the height of the block is a power of 2.

The following embodiments apply to the decoding method and decoding devices disclosed above.

In a first embodiment, wherein s1 is not a power of 2 and s2 is a power of 2, the scaling factor $S_{IQ}$ is proportional to $$\sqrt{\frac{4}{3}} \times \frac{1}{\sqrt{s_1^* s_2}}$$

where s1 is the width and s2 the height of the block or vice versa and where $s_1^*$ is the smallest integer equal to a power of 2 that is greater than s1.

Advantageously, when s1 is not a power of 2 and s2 is a power of 2, the scaling factor $S_{IQ}$ is substantially equal to $$\sqrt{\frac{4}{3}} \times \frac{1}{\sqrt{s_1^* s_2}} \times 2^{-(B-9)}$$

where B is the bitdepth of the image block.

Advantageously, in the specific case where $s_1=3\times 2^{n_1}$ and $s_2=2^{n_2}$, the scaling factor $S_{IQ}$ is substantially equal to $$\sqrt{\frac{4}{3}} \times 2^{-\left(B+\frac{(n_1+2+n_2)}{2}-9\right)}$$

in the case where $(n_1+2+n_2)\%2=0$, where % is the operator modulo.

and otherwise, the scaling factor $S_{IQ}$ is substantially equal to $$\sqrt{\frac{2}{3}} \times 2^{-\left(B+\frac{(n_1+2+n_2-1)}{2}-9\right)}.$$

In a second embodiment, wherein neither s1 nor s2 is a power of 2, the scaling factor $S_{IQ}$ is proportional to $$\frac{4}{3} \times \frac{1}{\sqrt{s_1^* s_2^*}}$$

where $s_1^*$ is the smallest integer equal to a power of 2 that is greater than s1 and where $s_2^*$ is the smallest integer equal to a power of 2 that is greater than s2.

Advantageously, when neither s1 nor s2 is a power of 2, the scaling factor $S_{IQ}$ is substantially equal to $$\frac{4}{3} \times \frac{1}{\sqrt{s_1^* s_2^*}} \times 2^{-(B-9)}$$

where B is the bitdepth of the block.

Advantageously, in the specific case where $s_1 = 3 \times 2^{n_1}$ and $s_2 = 3 \times 2^{n_2}$, the scaling factor $S_{IQ}$ is substantially equal to $$\frac{4}{3} \times 2^{-\left(B + \frac{(n_1 + n_2 + 4)}{2} - 9\right)}$$

in the case where and $(n_1 + 2 + n_2 + 2)\%2 = 0$, where % is the operator modulo and otherwise, the scaling factor $S_{IQ}$ is substantially equal to $$\frac{4}{3\sqrt{2}} \times 2^{-\left(B + \frac{(n_1 + n_2 + 3)}{2} - 9\right)}.$$

A coding method is also disclosed that comprises:
transforming an image block into a block of transform coefficients;
quantizing the block of transform coefficients by a quantization step size to obtain a quantized block; and
scaling the quantized block by a scaling factor to obtain a scaled block;
encoding the scaled block into a bitstream;
wherein the scaling factor, i.e. its value, depends on whether at least one of the width and the height of the block is a power of 2.

A coding device is also disclosed that comprises:
means for transforming an image block into a block of transform coefficients;
means for quantizing the block of transform coefficients by a quantization step size to obtain a quantized block; and
means for scaling the quantized block by a scaling factor to obtain a scaled block;
means for encoding the scaled block into a bitstream;
wherein the scaling factor depends on whether at least one of the width and the height of the block is a power of 2.

A coding device comprising a communication interface and at least one processor is disclosed. The communication interface is configured to access an image block and the at least one processor is configured to:
transform the accessed image block into a block of transform coefficients;
quantize the block of transform coefficients by a quantization step size to obtain a quantized block; and
scale the quantized block by a scaling factor to obtain a scaled block;
encode the scaled block into a bitstream;
wherein the scaling factor depends on whether at least one of the width and the height of the block is a power of 2.

The following embodiments apply to the coding method and coding devices disclosed above.

In a first embodiment, wherein s1 is not a power of 2 and s2 is a power of 2, the scaling factor $S_Q$ is proportional to $$\sqrt{\frac{3}{4}} \times \sqrt{s_1^* s_2}$$

where s1 is the width and s2 the height of the block or vice versa and where $s_1^*$ is the smallest integer equal to a power of 2 that is greater than s1.

Advantageously, when s1 is not a power of 2 and s2 is a power of 2, the scaling factor $S_Q$ is substantially equal to $$\sqrt{\frac{3}{4}} \times \sqrt{s_1^* s_2} \times 2^{-(29-B)}$$

where B is the bitdepth of said image block.

Advantageously, in the specific case where $s_1 = 3 \times 2^{n_1}$ and $s_2 = 2^{n_2}$, the scaling factor $S_Q$ is substantially equal to $$\sqrt{\frac{3}{4}} \times 2^{-\left(29 - B - \frac{(n_1 + n_2 + 2)}{2}\right)}$$

in the case where $(n_1 + 2 + n_2)\%2 = 0$, where % is the operator modulo.

and otherwise, the scaling factor $S_Q$ is substantially equal to $$\sqrt{\frac{3}{2}} \times 2^{-\left(29 - B - \frac{(n_1 + n_2 + 1)}{2}\right)}.$$

In a second embodiment, in the case where neither s1 nor s2 is a power of 2, said scaling factor $S_Q$ is proportional to $$\tfrac{3}{4} \times \sqrt{s_1^* s_2^*}$$

where s1 is the width and s2 the height of the block or vice versa and where $s_1^*$ is the smallest integer equal to a power of 2 that is greater than s1 and where $s_2^*$ is the smallest integer equal to a power of 2 that is greater than s2.

Advantageously, when neither s1 nor s2 is a power of 2, the scaling factor $S_Q$ is substantially equal to $$\tfrac{3}{4} \times \sqrt{s_1^* s_2^*} \times 2^{-(29-B)}$$

where B is the bitdepth of said image block.

Advantageously, in the specific case where $s_1 = 3 \times 2^{n_1}$ and $s_2 = 3 \times 2^{n_2}$ the scaling factor $S_Q$ is substantially equal to $$\frac{3}{4} \times 2^{-\left(29 - B - \frac{(n_1 + n_2 + 4)}{2}\right)}$$

in the case where $(n_1 + 2 + n_2 + 2)\%2 = 0$, where % is the operator modulo and otherwise, the scaling factor $S_Q$ is substantially equal to $$\frac{3\sqrt{2}}{4} \times 2^{-\left(29 - B - \frac{(n_1 + n_2 + 3)}{2}\right)}.$$

4. BRIEF SUMMARY OF THE DRAWINGS

FIG. 1 represents a flowchart of quantization and scaling of transform coefficients according to the prior art;

FIG. 2 represents an exemplary architecture of a transmitter configured to encode an image block in a bitstream according to a specific and non-limiting embodiment;

5. DETAILED DESCRIPTION

Figure 3:
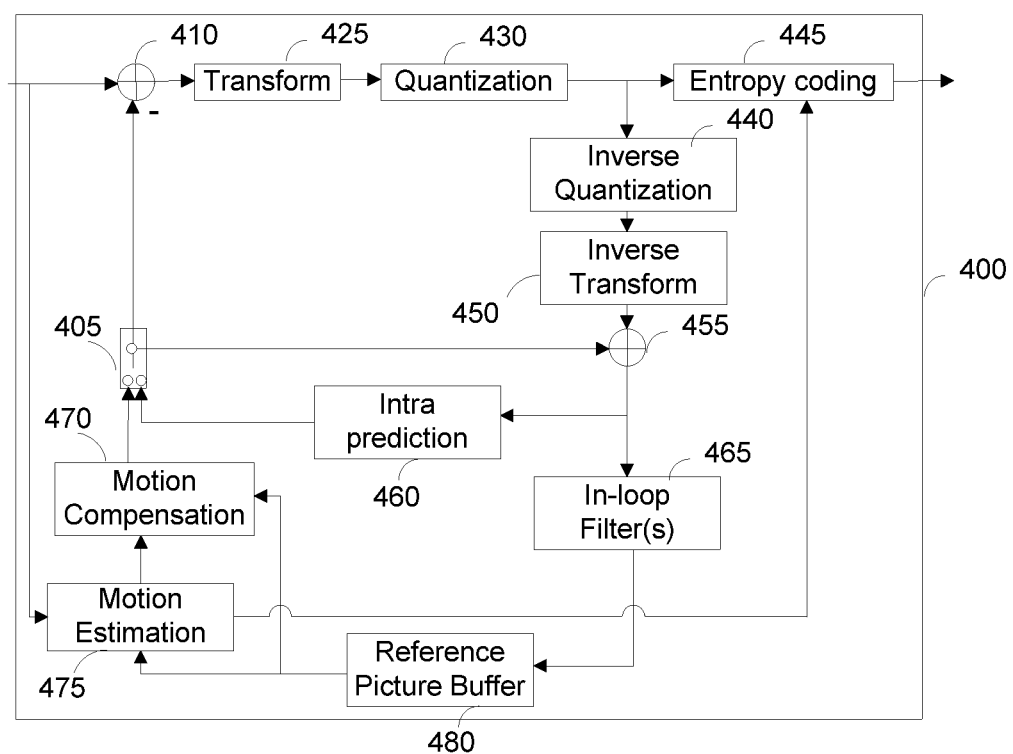
FIG. 3 illustrates an exemplary video encoder adapted to execute the encoding method according to the present principles.

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another. Various methods are described above, and each of the methods comprises one or more steps or actions for achieving the described method. Unless a specific order of steps or actions is required for proper operation of the method, the order and/or use of specific steps and/or actions may be modified or combined.

A picture is an array of luma samples in monochrome format or an array of luma samples and two corresponding arrays of chroma samples in 4:2:0, 4:2:2, and 4:4:4 colour format. Generally, a "block" addresses a specific area in a sample array (e.g., luma Y), and a "unit" includes the collocated block of all encoded color components (luma Y and possibly chroma Cb and chroma Cr). However, the term "block" or "image block" is used herein to refer to a block (e.g. a coding block or CB) or a unit (e.g. a coding unit or CU). In the present principles, a block may also refer to an array of residuals.

In the following, the word "reconstructed" and "decoded" can be used interchangeably. Usually but not necessarily "reconstructed" is used on the encoder side while "decoded" is used on the decoder side.

Various embodiments are described with respect to the HEVC standard. However, the present principles are not limited to HEVC, and can be applied to other standards, recommendations, and extensions thereof, including for example HEVC or HEVC extensions like Format Range (RExt), Scalability (SHVC), and Multi-View (MV-HEVC) Extensions. The various embodiments are described with respect to the encoding/decoding of an image block. They may be applied to encode/decode a whole picture or a whole sequence of images.

FIG. 2 represents an exemplary architecture of a transmitter 200 configured to encode an image block in a bitstream according to a specific and non-limiting embodiment.

The transmitter 200 comprises one or more processor(s) 2000, which could comprise, for example, a CPU, a GPU and/or a DSP (English acronym of Digital Signal Processor), along with internal memory 2030 (e.g. RAM, ROM, and/or EPROM). The transmitter 200 comprises one or more communication interface(s) 2010 (e.g. a keyboard, a mouse, a touchpad, a webcam), each adapted to display output information and/or allow a user to enter commands and/or data (e.g. a stream); and a power source 2020 which may be external to the transmitter 200. The transmitter 200 may also comprise one or more network interface(s) (not shown). Encoder module 2040 represents the module that may be included in a device to perform the coding functions. Additionally, encoder module 2040 may be implemented as a separate element of the transmitter 200 or may be incorporated within processor(s) 2000 as a combination of hardware and software as known to those skilled in the art. The image block may be obtained from a source. According to different embodiments, the source can be, but is not limited to:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network. According to an exemplary and non-limiting embodiment, the transmitter 200 further comprises a computer program stored in the memory 2030. The computer program comprises instructions which, when executed by the transmitter 200, in particular by the processor 2000, enable the transmitter 200 to execute the encoding method described with reference to FIG. 4. According to a variant, the computer program is stored externally to the transmitter 200 on a non-transitory digital data support, e.g. on an external storage medium such as a HDD, CD-ROM, DVD, a read-only and/or DVD drive and/or a DVD Read/Write drive, all known in the art. The transmitter 200 thus comprises a mechanism to read the computer program. Further, the transmitter 200 could access one or more Universal Serial Bus (USB)-type storage devices (e.g., "memory sticks.") through corresponding USB ports (not shown). According to exemplary and non-limiting embodiments, the transmitter 200 can be, but is not limited to:
- a mobile device;
- a communication device;
- a game device;
- a tablet (or tablet computer);
- a laptop;
- a still image camera;
- a video camera;
- an encoding chip or encoding device/apparatus;
- a still image server; and
- a video server (e.g. a broadcast server, a video-on-demand server or a web server).

Figure 4:
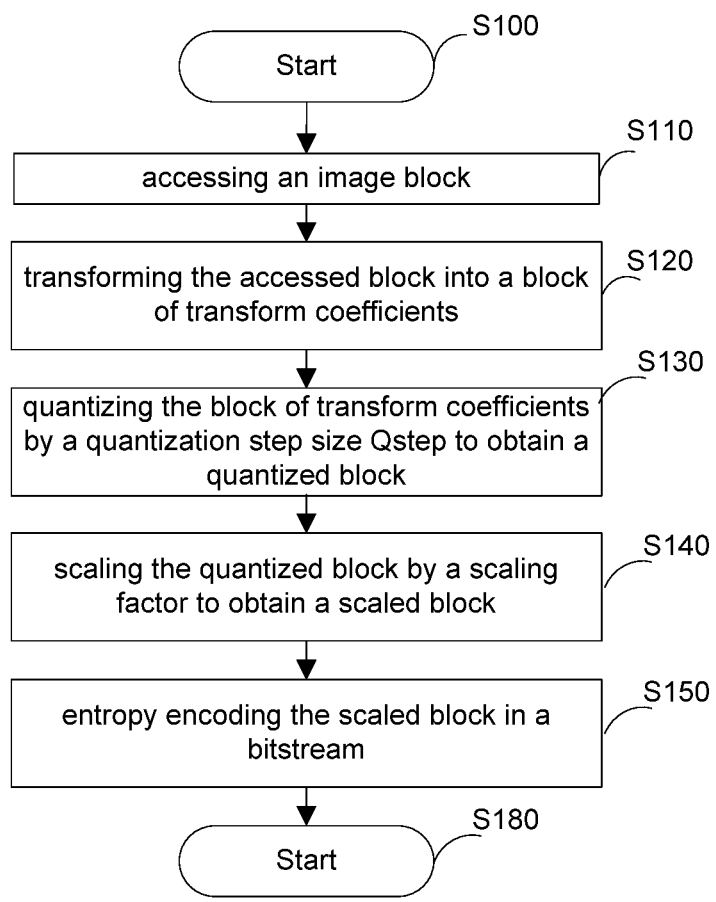
FIG. 4 represents a flowchart of a method for encoding an image in a bitstream according to a specific and non-limiting embodiment.

FIG. 3 illustrates an exemplary video encoder 400 adapted to execute the encoding method of FIG. 4. The encoder 400 is an example of a transmitter 200 or may be part of such a transmitter 200.

To encode a video sequence with one or more pictures, a picture may be partitioned into coding tree units (CTU) of square shape with a configurable size. A consecutive set of coding tree units may be grouped into a slice. A CTU is the root of a tree partitioning into Coding Units. To encode a video sequence with one or more images, an image is partitioned into one or more slices where each slice can include one or more slice segments. A slice segment is organized into coding units, prediction units and transform units. The HEVC specification distinguishes between "blocks" and "units," where a "block" addresses a specific area in a sample array (e.g., luma, Y), and the "unit" includes the collocated block of all encoded color components (Y, Cb, Cr, or monochrome), syntax elements and prediction data that are associated with the block (e.g., motion vectors). For coding, an image is partitioned into basic coding blocks, e.g. into coding tree blocks (CTB) of square shape with a configurable size in HEVC or into macroblocks in H.264, and a set of possibly consecutive basic coding blocks is grouped into a slice. Usually, the basic coding units are of square shape of $2^n \times 2^n$ samples, where n is an integer, e.g. $n \in \{4, 5, 6\}$. In HEVC, the smallest CTU size 16×16 corresponds to a macroblock size as used in previous video coding standards. It will be understood that, although the terms CTU and CTB are used herein to describe encoding/decoding methods and encoding/decoding apparatus, these methods and apparatus should not be limited by these specific terms that may be worded differently (e.g. macroblock) in other standards such as H.264 or H.266. A Coding Tree Unit (CTU) corresponding to a CTB contains the CTBs of the encoded color components. More generally, a basic coding unit corresponding to a basic coding block contains the basic coding blocks of the encoded color components. A CTB is the root of a quadtree partitioning into Coding Blocks (CB), and a Coding Block is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can be used to refer to a macroblock, a partition and a sub-block as specified in H.264/AVC or other video coding standards, and more generally to refer to an array of samples of various sizes.

In the exemplary encoder 400, a picture is encoded by the encoder modules as described below. Each block is encoded using either an intra or inter mode. When a block is encoded in an intra mode, the encoder 400 performs intra prediction (module 460). In an inter mode, motion estimation (module 475) and compensation (module 470) are performed. The encoder decides (module 405) which one of the intra mode or inter mode to use for encoding the block, and indicates the intra/inter decision by a prediction mode flag. Residuals are calculated by subtracting (module 410) a block of prediction samples (also known as a predictor) from the original image block.

As an example, blocks in intra mode are predicted from reconstructed neighboring samples. Inter prediction is performed by motion-compensating a reference block stored in a reference picture buffer 480.

The residuals are transformed (module 425) and quantized (module 430). The quantized transform coefficients, as well as motion vectors and other syntax elements, are entropy coded (module 445) to output a bitstream. The encoder may also skip the transform and apply quantization directly to the non-transformed residual signal. The encoder may also bypass both transform and quantization, i.e., the residual is coded directly without the application of the transform or quantization process. In direct PCM coding, no prediction is applied and the block samples are directly coded into the bitstream.

The encoder comprises a decoding loop and thus decodes an encoded block of size N×N with $N=2^M$ and M is an integer to provide a reference for further predictions. The quantized transform coefficients are de-quantized (module 440) and inverse transformed (module 450) to decode residuals. An image block is reconstructed by combining (module 455) the decoded residuals and the block of prediction samples. An in-loop filter (465) may be applied to the reconstructed picture, for example, to perform deblocking/SAO (Sample Adaptive Offset) filtering to reduce coding artifacts. The filtered image is stored in the reference picture buffer 480. Usually, the transform and quantization are implemented in a fixed-point way. These operations may thus comprise some scaling steps. In HEVC, the quantization is implemented by multiplying the transform coefficients by $2^{14}$ and then dividing them by Qstep and de-quantization by multiplying the quantized transform coefficients by $2^6$ and Qstep. More precisely, in HEVC, a quantization parameter (QP) is used to determine the quantization step size Qstep. QP can take 52 values from 0 to 51. An increase of 1 in QP means an increase of the quantization step size by approximately 12% (i.e., $2^{1/6}$). An increase of 6 leads to an increase in the quantization step size by a factor of 2. In addition to specifying the relative difference between the step-sizes of two consecutive QP values, there is a need to define the absolute step-size associated with the range of QP values. This is done by selecting Qstep=1 for QP=4. The resulting relationship between QP and the equivalent quantization step size is given by the following equations:

$$Qstep(QP) = (2^{1/6})^{QP-4}$$

which can also be expressed as:

$$Qstep(QP) = G_{QP \%6} \ll \frac{QP}{6}$$

where $G=[G_0, \ldots, G_5]^T=[2^{-4/6}, 2^{-3/6}, 2^{-2/6}, 2^{-1/6}, 2^0, 2^{1/6}]^T$
HEVC quantization and de-quantization are basically fixed-point approximation of the latter equation. Additional scale factors $S_Q$ and $S_{IQ}$ are thus used to restore the norm of the residual block which gets modified because of the scaling used in fixed point implementation. In HEVC, the fixed point approximation of the latter equation is given by $g_{QP \, \%6}=\text{round}(2^6 \times G_{QP \, \%6})$, which results in $g=[g_0, \ldots, g_5]^T=[40, 45, 51, 57, 64, 72]^T$
The de-quantization in HEVC is expressed as follows:

$$coeff_{IQ} = \left(\left(level \times \left(g_{QP \, \%6} \ll \frac{QP}{6}\right)\right) + offset_{IQ}\right) \gg shift1$$

where QP is the quantization parameter, $coeff_{IQ}$ is the resulting de-quantized transform coefficient, level is the quantized transform coefficient, $offset_{IQ}$ is the offset used for appropriate rounding, shift1=(M−9+B) with B being the bit depth of the encoded video to which the block belongs, and $offset_{IQ}=1\ll(M-10+B)$.
The quantization in HEVC is expressed as follows:

$$level = \left((coeff \times f_{QP \, \%6} + offset_Q) \gg \frac{QP}{6}\right) \gg shift2$$

where QP is the quantization parameter, coeff is the transform coefficient, level is the resulting quantized transform coefficient, $offset_Q$ is the offset used for appropriate rounding in the division by $Q_{step}$, and shift2=29−M−B and $f=[f_0, \ldots f_5]^T=[26214, 23302, 20560, 18396, 16384, 14564]^T$.

FIG. 4 represents a flowchart of a method for encoding an image in a bitstream according to a specific and non-limiting embodiment.

The method starts at step S100. At step S110, a transmitter, e.g. such as the encoder 400, accesses an image block. According to the present principles, an image block is an array of luma or chroma samples, or an array of residuals. A block of residuals may be obtained by subtracting a predictor, i.e. an array of prediction samples, from a block of luma or chroma samples.

At step S120, the transmitter transforms the accessed block into a block of transform coefficients, e.g. a block of DCT coefficients in the case where the transform is a DCT transform (Discrete Cosine Transform). It will be appreciated, however, that the present principles are not restricted to this specific transform.

At step S130, the transmitter quantizes the block of transform coefficients by a quantization step size Qstep to obtain a quantized block. Conceptually, quantization comprises dividing the transform coefficients by the quantization step size Qstep. Usually, the transform and quantization are implemented in a fixed-point way. These operations may require some scaling steps.

At step S140, the transmitter scales the quantized block, i.e. the block of quantized transform coefficients, by a scaling factor $S_Q$ to obtain a scaled block. Scaling a block includes scaling each coefficient of the block. According to the present principles the value of the scaling factor depends on whether at least one of the width and the height of the block is equal to a power of 2, i.e. is equal to $2^n$, where n is an integer. The scaling factor $S_Q$ according to the present principles is thus adapted to scale a block whose width and/or height is not a power of 2, e.g. is equal to $3 \times 2^n$, n being an integer. The scaling factor $S_Q$ is defined to ensure that the norm of a corresponding residual block is preserved between the spatial domain and the transform domain.

According to the present principles, "equal to" is to be understood as "substantially equal to" since the scaling factor's value may be determined using fixed-point number in which case rounding errors may occur.

Figure 9:
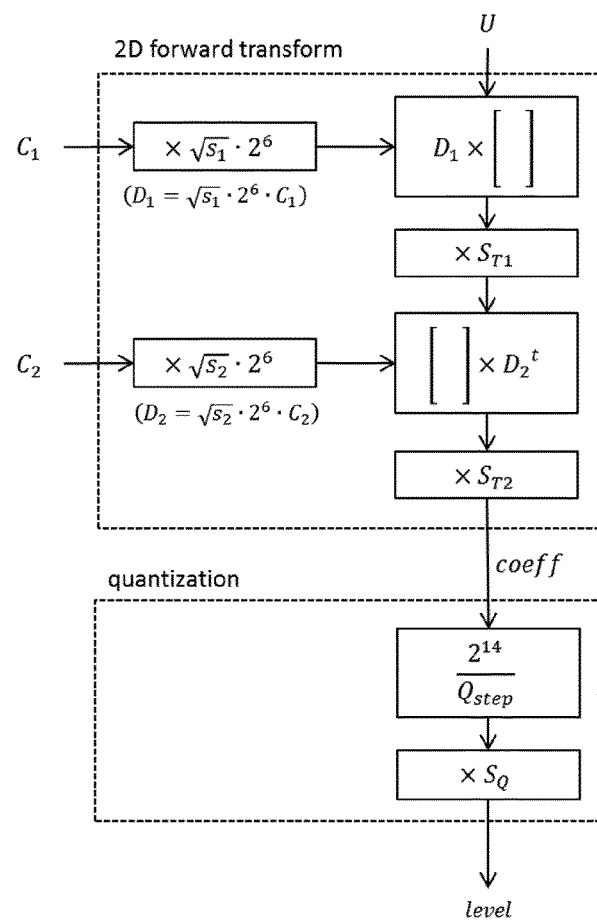
FIG. 9 depicts a forward transform and forward quantization processes to be applied on a residual block U according to a specific and non-limiting embodiment.

FIG. 9 depicts the forward transform and forward quantization processes to be applied on a residual block U with generic size ($s_1$, $s_2$). The forward transform is implemented as separable 1D column and row transforms (D1 and D2$^t$ respectively).

C1 and C2 represent the coefficients of the vectors of each separable transform 1D transform, respectively applied in each direction to obtain a 2D transform of the input block. They contain floating point coefficients of each 1D inverse transform successively applied in the vertical and horizontal directions.

For example, in the case of the DCT (classical Discrete Cosine Transform used in video codecs):

$$C_1 = \sqrt{\frac{2}{s_1}} \left( c(k) \cdot \cos\left(\frac{(2j+1)k\pi}{2s_1}\right) \right)_{k,j \in [0, s_1-1]}$$

$$\forall k \geq 0, \, c(k) = \begin{cases} 1/\sqrt{2} & \text{if } k = 0 \\ 0 & \text{otherwise} \end{cases}$$

D1 and D2 are integer-based representations of C1 and C2 respectively, with a precision level that depends on the block size in each direction:
$D_i = \lfloor C_i \cdot 2^6 \cdot \sqrt{s_i} + 0.5 \rfloor$, i=1,2 where $\lfloor x \rfloor$ returns the closest integer smaller than or equal to x.

As depicted on FIG. 9, the successive scaling operations that take place during the forward transform and forward quantization processes are the following ones:

$\sqrt{s_1} \times 2^6$: scale factor used during the first (horizontal) forward transform stage $S_{T1}$: scale factor applied after the first forward transform stage $\sqrt{s_2} \times 2^6$: scale factor applied during the second (vertical) forward transform stage $S_{T2}$: scale factor applied after the second forward transform stage $2^{14}$: scale factor applied during the forward quantization stage $S_Q$: scale factor applied after the forward quantization stage Table 1 provides the values of each scale factor involved, together with the overall scale factor resulting from the product of all scale factors used in the forward 2D transform of the block. It is equal to $$\frac{1}{\sqrt{s_1 s_2}} \times 2^{15-B},$$

where B is the considered bit-depth.

TABLE 1

| | Scale Factor |
|---|---|
| First Forward transform stage ($S_t$) | $\sqrt{s_1} \cdot 2^6$ |
| After the first transform stage ($S_{T1}$) | $2^{-(B-9)} \times \frac{1}{s_1}$ |
| Second forward transfrom stage($S'_t$) | $\sqrt{s_2} \cdot 2^6$ |

TABLE 1-continued

| | Scale Factor |
|---|---|
| After the second transform stage ($S_{T2}$) | $2^{-6} \times \dfrac{1}{s_2}$ |
| Total scaling for the 2D forward transform | $\dfrac{1}{\sqrt{s_1 s_2}} \cdot 2^{15-B}$ |

In order to ensure that the scaling factor that the norm of a corresponding residual block is preserved between the spatial domain and the transform domain for Qstep=1, i.e. QP=4, the scaling factor $S_Q$ is defined such that:

$$S_Q \times f_4 \times \frac{1}{\sqrt{s_1 s_2}} \times 2^{15-B} = 1$$

which leads to $$S_Q = \sqrt{s_1 s_2} \times 2^{-(15-B)} \times \frac{1}{f_4}$$

In a first embodiment in which s1 is not a power of 2 and s2 is a power of 2, the scaling factor $S_Q$ is equal to:

$$\sqrt{\frac{s_1}{s_1^*}} \times \sqrt{s_1^* s_2} \times 2^{-(15-B)} \times \frac{1}{f_4}$$

In the specific case where $f_4 = 2^f$ $$S_Q = \sqrt{\frac{s_1}{s_1^*}} \times \sqrt{s_1^* s_2} \times 2^{-(15+f-B)}$$

In the specific case where f=14

$$S_Q = \sqrt{\frac{s_1}{s_1^*}} \times \sqrt{s_1^* s_2} \times 2^{-(29-B)}$$

where B is the bitdepth of the image block, s1 is the width and s2 the height of the block or vice versa and $s_1^*$ is the smallest integer equal to a power of 2 that is greater than s1.

In the specific case where $s_1 = 3 \times 2^{n_1}$ and $s_2 = 2^{n_2}$, the scaling factor $S_Q$ is proportional to $$\sqrt{\frac{3}{4}} \times \sqrt{s_1^* s_2}.$$

More precisely, for f=14, $$S_Q = \sqrt{\frac{3}{4}} \times \sqrt{s_1^* s_2} \times 2^{-(29-B)}$$

where $s_1^* = 4/3 \times s_1 = 2^{n_1+2}$

This leads to two sub-cases depending on whether $n_1 + 2 + n_2$ is a multiple of 2.

In the case where $(n_1 + 2 + n_2)\%2 = 0$, where % is the operator modulo, $$S_Q = \sqrt{\frac{3}{4}} \times 2^{-\left(29 - B - \frac{(n_1 + 2 + n_2)}{2}\right)} \quad (1)$$

and otherwise, $$S_Q = \sqrt{\frac{3}{2}} \times 2^{-\left(29 - B - \frac{(n_1 + 1 + n_2)}{2}\right)} \quad (2)$$

Equation (1) may be implemented in a fixed-point manner as follows:

$$S_Q = \left\lfloor \frac{111}{2^7} \right\rfloor \times 2^{-\left(29 - B - \frac{(n_1 + 2 + n_2)}{2}\right)}$$

and Equation (2) may be implemented in a fixed-point manner as follows:

$$S_Q = \left\lfloor \frac{157}{2^7} \right\rfloor \times 2^{-\left(29 - B - \frac{(n_1 + n_2 + 1)}{2}\right)}$$

In a second embodiment in which neither s1 nor s2 is a power of 2, the scaling factor is equal to $$S_Q = \sqrt{\frac{s_1}{s_1^*}} \times \sqrt{\frac{s_2}{s_2^*}} \times \sqrt{s_1^* s_2^*} \times 2^{(15-B)} \times \frac{1}{f_4}$$

In the specific case where $f_4 = 2^f$ $$S_Q = \sqrt{\frac{s_1}{s_1^*}} \times \sqrt{\frac{s_2}{s_2^*}} \times \sqrt{s_1^* s_2^*} \times 2^{-(15+f-B)} \times \frac{1}{f_4}$$

In the specific case where f=14

$$S_Q = \sqrt{\frac{s_1}{s_1^*}} \times \sqrt{\frac{s_2}{s_2^*}} \times \sqrt{s_1^* s_2^*} \times 2^{-(29-B)}$$

where $s_1^*$ is the smallest integer equal to a power of 2 that is greater than s1 and $s_2^*$ is the smallest integer equal to a power of 2 that is greater than s2.

In the specific case where $s_1 = 3 \times 2^{n_1}$ and $s_2 = 3 \times 2^{n_2}$, the scaling $S_Q$ factor is proportional to $3/4 \times \sqrt{s_1^* s_2^*}$.

In the specific case where f=14, $$S_Q = 3/4 \times \sqrt{s_1^* * s_2^*} \times 2^{-(29-B)}$$

where $s_1^* = 4/3 \times s_1 = 2^{n_1+2}$ and $s_2^* = 4/3 \times s_2 = 2^{n_2+2}$ This leads to two sub-cases depending on whether $n_1+2+n_2+2$ is a multiple of 2.

In the case where $(n_1+n_2+4)\%2=0$, where % is the operator modulo, $$S_Q = \frac{3}{4} \times 2^{-\left(29-B-\frac{(n_1+n_2+4)}{2}\right)} \quad (3)$$

and otherwise, $$S_Q = \frac{3\sqrt{2}}{4} \times 2^{-\left(29-B-\frac{(n_1+n_2+3)}{2}\right)} \quad (4)$$

Equation (3) may be implemented in a fixed-point manner as follows:

$$S_Q = \left\lfloor \frac{96}{27} \right\rfloor \times 2^{-\left(29-B-\frac{(n_1+n_2+4)}{2}\right)}$$

In a variant, equation (3) is implemented in a fixed-point manner as follows:

$$S_Q \left( 2^{-\left(29-B-\frac{(n_1+n_2+4)}{2}\right)} \times 3 \right) >> 2$$

where ">>" is a right shift operator.
and Equation (4) may be implemented in a fixed-point manner as follows:

$$S_Q = \left\lfloor \frac{136}{27} \right\rfloor \times 2^{-\left(29-B-\frac{(n_1+n_2+3)}{2}\right)}$$

At step S150, the transmitter encodes the scaled block in a bitstream by entropy coding, e.g. CABAC or CALVC. It will be appreciated, however, that the present principles are not restricted to these specific entropy coding processes.

Figure 5:
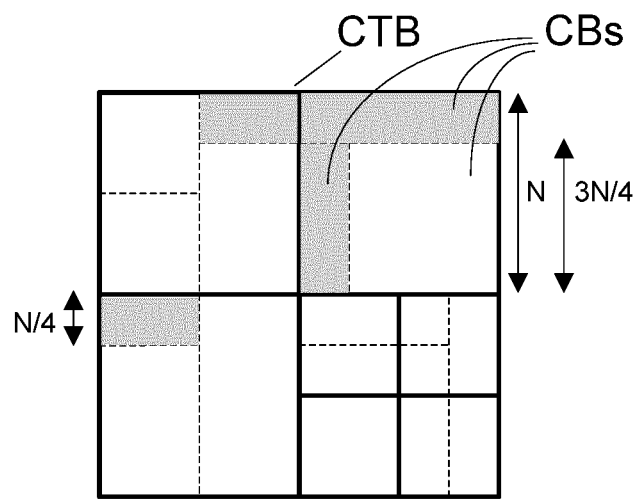
FIG. 5 depicts an example of a partitioning of a CTB into asymmetric CBs according to the present principles.

Steps S110 to S150 may be iterated to encode all the blocks of an image. The method ends at step S180.
The encoding method according to the present principles is advantageously applied on coding block split into asymmetric sub-blocks as depicted on FIG. 5. On this figure, a CTB is split into asymmetric CBs. As an example, a coding block may be split horizontally into one sub-block of height h/4 and one sub-block of height 3h/4. The sub-block of height h/4 is either above or below the sub-block of height 3h/4. In another embodiment, the coding block may be split vertically into one sub-block of width w/4 and one sub-block of width 3w/4. The sub-block of width w/4 is either on the left or right of the sub-block of width 3w/4. In a specific embodiment, the coding block is split either horizontally or vertically into sub-blocks whose size is not a power of two, e.g. their size in width w or height h is equal to $3 \times 2^n$ pixels with n being an integer.

Figure 6:
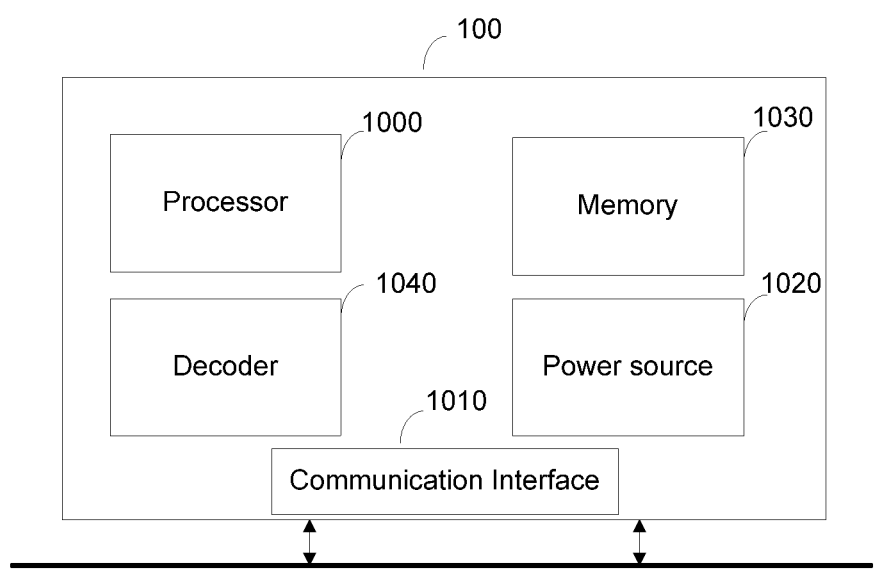
FIG. 6 represents an exemplary architecture of a receiver configured to decode an image block from a bitstream according to a specific and non-limiting embodiment.

FIG. 6 represents an exemplary architecture of a receiver 100 configured to decode an image block from a bitstream to obtain a decoded image block according to a non-limiting embodiment.

The receiver 100 comprises one or more processor(s) 1000, which could comprise, for example, a CPU, a GPU and/or a DSP (English acronym of Digital Signal Processor), along with internal memory 1030 (e.g. RAM, ROM and/or EPROM). The receiver 100 comprises one or more communication interface(s) 1010 (e.g. a keyboard, a mouse, a touchpad, a webcam), each adapted to display output information and/or allow a user to enter commands and/or data (e.g. the decoded image block); and a power source 1020 which may be external to the receiver 100. The receiver 100 may also comprise one or more network interface(s) (not shown). The decoder module 1040 represents the module that may be included in a device to perform the decoding functions. Additionally, the decoder module 1040 may be implemented as a separate element of the receiver 100 or may be incorporated within processor(s) 1000 as a combination of hardware and software as known to those skilled in the art.

The bitstream may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- a picture capturing circuit (e.g. a sensor such as, for example, a CCD (or Charge-Coupled Device) or CMOS (or Complementary Metal-Oxide-Semiconductor)).

According to different embodiments, the decoded image block may be sent to a destination, e.g. a display device. As an example, the decoded image block is stored in a remote or in a local memory, e.g. a video memory or a RAM, a hard disk. In a variant, the decoded image block is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 100 further comprises a computer program stored in the memory 1030. The computer program comprises instructions which, when executed by the receiver 100, in particular by the processor 1000, enable the receiver to execute the decoding method described with reference to FIG. 8. According to a variant, the computer program is stored externally to the receiver 100 on a non-transitory digital data support, e.g. on an external storage medium such as a HDD, CD-ROM, DVD, a read-only and/or DVD drive and/or a DVD Read/Write drive, all known in the art. The receiver 100 thus comprises a mechanism to read the computer program. Further, the receiver 100 could access one or more Universal Serial Bus (USB)-type storage devices (e.g., "memory sticks.") through corresponding USB ports (not shown).

According to exemplary and non-limiting embodiments, the receiver 100 can be, but is not limited to:
- a mobile device;
- a communication device;
- a game device;
- a set top box;
- a TV set;

a tablet (or tablet computer);
a laptop;
a video player, e.g. a Blu-ray player, a DVD player;
a display and
a decoding chip or decoding device/apparatus.

Figure 7:
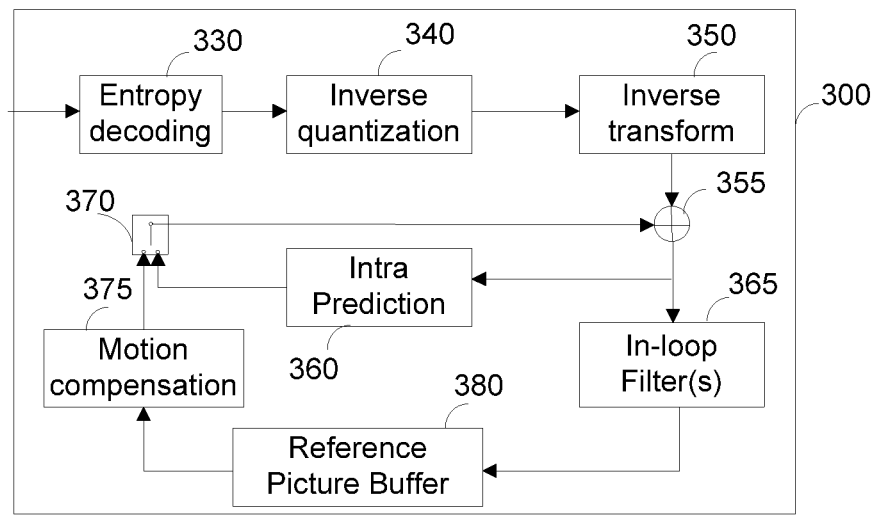
FIG. 7 illustrates a block diagram of an exemplary video decoder adapted to execute the decoding method according to the present principles.
Figure 8:
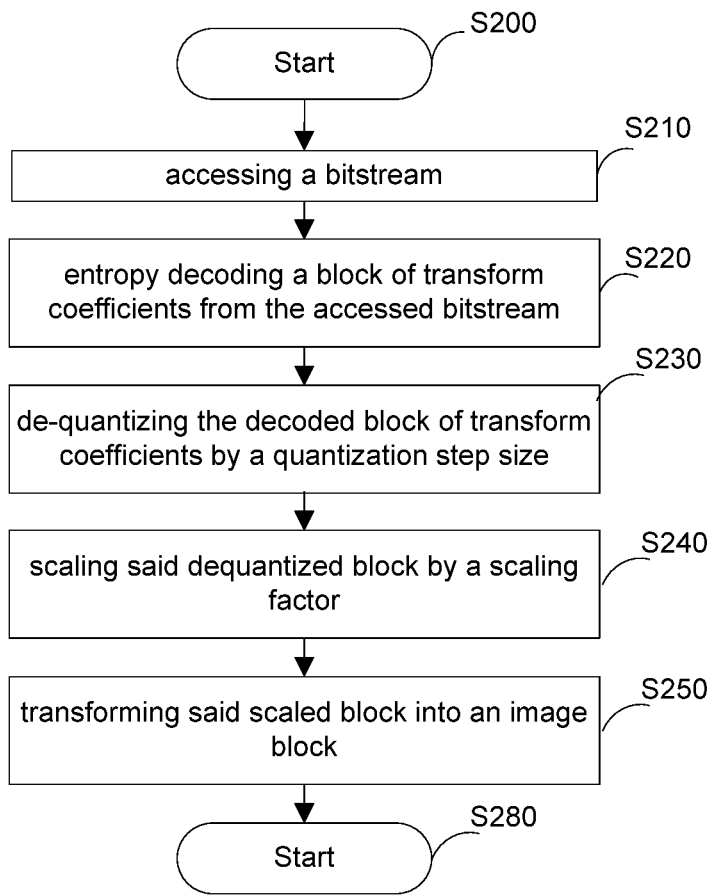
FIG. 8 represents a flowchart of a method for decoding an image block from a bitstream according to a specific and non-limiting embodiment.

FIG. 7 illustrates a block diagram of an exemplary video decoder 300 adapted to execute the decoding method of FIG. 8. The video decoder 300 is an example of a receiver 100 or part of such a receiver 100. In the exemplary decoder 300, a bitstream is decoded by the decoder elements as described below. Video decoder 300 generally performs a decoding pass reciprocal to the encoding pass as described in FIG. 3, which performs video decoding as part of encoding video data.

In particular, the input of the decoder includes a video bitstream, which may be generated by the video encoder 400. The bitstream is first entropy decoded (330) to obtain transform coefficients, motion vectors, and other coded information. The transform coefficients are de-quantized (340) and inverse transformed (350) which provides decoded residuals. The decoded residuals are then combined (355) with a block of prediction samples (also known as a predictor) to obtain a decoded/reconstructed image block. The block of prediction samples may be obtained (370) from intra prediction (360) or motion-compensated prediction (i.e., inter prediction) (375). As described above, AMVP and merge mode techniques may be used during motion compensation, which may use interpolation filters to calculate interpolated values for sub-integer samples of a reference block. An in-loop filter (365) may be applied to the reconstructed image. The in-loop filter may comprise a deblocking filter and a SAO filter. The filtered image is stored at a reference picture buffer (380).

FIG. 8 represents a flowchart of a method for decoding an image block from a bitstream according to a specific and non-limiting embodiment.

The method starts at step S200. At step S210, a receiver 100 such as the decoder 300 accesses a bitstream. At step S220, the receiver decodes at least one block of transform coefficients from the bitstream by entropy decoding.

At step S230, the receiver de-quantizes the decoded block of transform coefficients by a quantization step size Qstep to obtain a de-quantized block. Conceptually, de-quantization comprises multiplying the transform coefficients by the quantization step size Qstep. Usually, the transform and quantization are implemented in a fixed-point way. These operations may thus comprise some scaling steps. In HEVC, the de-quantization is implemented by multiplying the transform coefficients by $2^6$ and by Qstep.

At step S240, the receiver scales the de-quantized block by a scaling factor $S_{IQ}$ to obtain a scaled block. Scaling a block includes scaling each coefficient of the block.

According to the present principles the value of the scaling factor $S_{IQ}$ depends on whether at least one of the width and the height of the block to be scaled is equal to a power of 2, i.e. is equal or not to $2^n$, where n is an integer. The scaling factor $S_{IQ}$ according to the present principles is thus adapted to scale a block whose width and/or height is not a power of 2, e.g. is equal to $3\times2^n$, n being an integer. The scaling factor $S_{IQ}$ is defined to ensure that the norm of a corresponding residual block is preserved between the spatial domain and the transform domain.

According to the present principles, "equal to" is to be understood as "substantially equal to" since the scaling factor's value may be determined using fixed-point number in which case rounding errors may occur.

Figure 10:
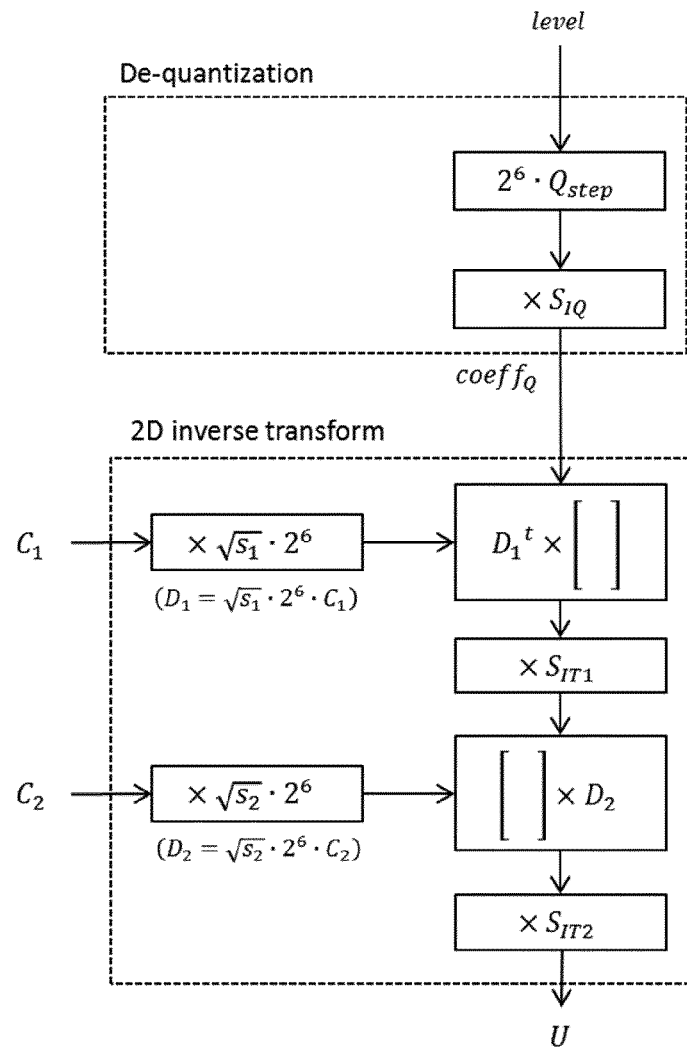
FIG. 10 depicts an inverse transform and inverse quantization processes to be applied on a block of quantized coefficients according to a specific and non-limiting embodiment.

FIG. 10 depicts the inverse transform and inverse quantization processes to be applied on a block of quantized coefficients (level) with generic size ($s_1$, $s_2$). The inverse transform is implemented as separable 1D column and row transforms (D1$^t$, and D2 respectively). C1 and C2 represent the coefficients of the vectors of each separable transform 1D transform, respectively applied in each direction to obtain a 2D transform of the input block. They contain floating point coefficients of each 1D inverse transform successively applied in the vertical and horizontal directions.

For example, in the case of the DCT (classical Discrete Cosine Transform used in video codecs), we have:

$$C_1 = \sqrt{\frac{2}{s_1}} \left( c(k) \cdot \cos\left(\frac{(2j+1)k\pi}{2s_1}\right) \right)_{k,j \in [0, s_1 - 1]}$$

$$\forall k \geq 0, c(k) = \begin{cases} 1/\sqrt{2} & \text{if } k = 0 \\ 0 & \text{otherwise} \end{cases}$$

D1 and D2 are integer-based representations of C1 and C2 respectively, with a precision level that depends on the block size in each direction:

$$D_i = \lfloor C_i \cdot 2^6 \cdot \sqrt{s_i} + 0.5 \rfloor, i = 1, 2$$

As depicted on FIG. 10, the successive scaling operations that take place during the forward transform and forward quantization processes are the following ones:

$2^6$: scale factor applied during the inverse quantization stage $S_{IQ}$: scale factor applied after the inverse quantization stage $\sqrt{s_1} \times 2^6$: scale factor used during the first (horizontal) inverse transform stage $S_{IT1}$: scale factor applied after the first inverse transform stage $\sqrt{s_2} \times 2^6$: scale factor applied during the second (vertical) inverse transform stage $S_{IT2}$: scale factor applied after the second inverse transform stage Table 2 provides the values of each scale factor involved, together with the overall scale factor resulting from the product of all scale factors used in the inverse 2D transform of the block. It is equal to $\sqrt{s_1 s_2} \times 2^{-(15-B)}$, where B is the considered bit-depth.

TABLE 2

| | Scale Factor |
|---|---|
| First inverse transform stage ($S_{it}$) | $\sqrt{s_1} \cdot 2^6$ |
| After the first inverse transform stage ($S_{IT1}$) | $2^{-7}$ |
| Second inverse transform stage ($S_{it'}$) | $\sqrt{s_2} \cdot 2^6$ |
| After the second inverse transform stage ($S_{IT2}$) | $2^{-(20-B)}$ |
| Total scaling for the 2D inverse transform | $\sqrt{s_1 s_2} \cdot 2^{-(15-B)}$ |

In order to ensure that the scaling factor that the norm of a corresponding residual block is preserved between the spatial domain and the transform domain for Qstep=1, i.e. QP=4, the scaling factor $S_{IQ}$ is defined such that:

$$S_{IQ} \times g_4 \times \sqrt{s_1 s_2} \times 2^{-(15-B)} = 1$$

which leads to $S_{IQ} =$ $$\frac{1}{\sqrt{s_1 s_2}} \times 2^{-(B-15)} \times \frac{1}{g_4}$$

In a first embodiment where s1 is not a power of 2 and s2 is a power of 2, the scaling factor $S_{IQ}$ is equal to $$\sqrt{\frac{s_1^*}{s_1}} \times \frac{1}{\sqrt{s_1^* s_2}} \times 2^{-(B-15)} \times \frac{1}{g_4}$$

In the specific case where $g_4 = 2^g$, $$S_{IQ} = \sqrt{\frac{s_1^*}{s_1}} \times \frac{1}{\sqrt{s_1^* s_2}} \times 2^{-(15+g-B)}$$

In the specific case where g=6, $$S_{IQ} = \sqrt{\frac{s_1^*}{s_1}} \times \frac{1}{\sqrt{s_1^* s_2}} \times 2^{-(B-9)}$$

where B is the bitdepth of the image block, s1 is the width and s2 the height of the block or vice versa and $s_1^*$ is the smallest integer equal to a power of 2 that is greater than s1.

In the specific case where $s_1 = 3 \times 2^{n_1}$ and $s_2 = 2^{n_2}$, the scaling $S_{IQ}$ factor is proportional to $$\sqrt{\frac{4}{3}} \times \frac{1}{\sqrt{s_1^* s_2}}.$$

In the specific case where g=6, i.e. $g_4 = 64$, $$S_{IQ} = \sqrt{\frac{4}{3}} \times \frac{1}{\sqrt{s_1^* s_2}} \times 2^{-(B-9)}$$

where $s_1^* = 4/3 \times s_1 = 2^{n_1+2}$

This leads to two sub-cases depending on whether $n_1 + 2 + n_2$ is a multiple of 2.

In the case where $(n_1 + 2 + n_2)\%2 = 0$, where % is the operator modulo, the scaling factor is equal to $$S_{IQ} = \sqrt{\frac{4}{3}} \times 2^{-\left(B + \frac{(n_1+2+n_2)}{2} - 9\right)} \quad (5)$$

and otherwise, the scaling factor is equal to $$S_{IQ} = \sqrt{\frac{2}{3}} \times 2^{-\left(B + \frac{(n_1+n_2+1)}{2} - 9\right)} \quad (6)$$

Equation (5) may be implemented in a fixed-point manner as follows:

$$S_{IQ} = \left\lfloor \frac{296}{2^8} \right\rfloor \times 2^{-\left(B + \frac{(n_1+2+n_2)}{2} - 9\right)}$$

and Equation (6) may be implemented in a fixed point manner as follows:

$$S_{IQ} = \left\lfloor \frac{209}{2^8} \right\rfloor \times 2^{-\left(B + \frac{(n_1+n_2+1)}{2} - 9\right)}$$

In a second embodiment where neither s1 nor s2 is a power of 2, the scaling factor is equal to $$S_{IQ} = \sqrt{\frac{s_1^*}{s_1}} \times \sqrt{\frac{s_2^*}{s_2}} \times \frac{1}{\sqrt{s_1^* s_2^*}} \times 2^{-(B-15)} \times \frac{1}{g_4}$$

In the specific case where $g_4 = 2^g$ $$S_{IQ} = \sqrt{\frac{s_1^*}{s_1}} \times \sqrt{\frac{s_2^*}{s_2}} \times \frac{1}{\sqrt{s_1^* s_2^*}} \times 2^{-(B-15+g)}$$

In the specific case where g=6

$$S_{IQ} = \sqrt{\frac{s_1^*}{s_1}} \times \sqrt{\frac{s_2^*}{s_2}} \times \frac{1}{\sqrt{s_1^* s_2^*}} \times 2^{-(B-9)}$$

where $s_1^*$ is the smallest integer equal to a power of 2 that is greater than s1 and $s_2^*$ is the smallest integer equal to a power of 2 that is greater than s2.

In the specific case where $s_1 = 3 \times 2^{n_1}$ and $s_2 = 3 \times 2^{n_2}$, the scaling factor $S_{IQ}$ is proportional to $$\frac{4}{3} \times \frac{1}{\sqrt{s_1^* s_2^*}}.$$

In the specific case where g=6, $$S_{IQ} = \frac{4}{3} \times \frac{1}{\sqrt{s_1^* s_2^*}} \times 2^{-(B-9)}$$

where $s_1^* = 4/3 \times s_1 = 2^{n_1+2}$ and $s_2^* = 4/3 \times s_2 = 2^{n_2+2}$ This leads to two sub-cases depending on whether $n_1 + 2 + n_2 + 2$ is a multiple of 2.

In the case where $(n_1+n_2+4)\%2=0$, where % is the operator modulo, $$S_{IQ} = \frac{4}{3} \times 2^{-\left(B+\frac{(n_1+n_2+4)}{2}-9\right)} \qquad (7)$$

and otherwise, $$S_{IQ} = \frac{4}{3\sqrt{2}} \times 2^{-\left(B+\frac{(n_1+n_2+3)}{2}-9\right)} \qquad (8)$$

Equation (7) may be implemented in a fixed-point manner as follows:

$$S_{IQ} = \left\lfloor \frac{341}{2^8} \right\rfloor \times 2^{-\left(B+\frac{(n_1+n_2+4)}{2}-9\right)}$$

and Equation (8) may be implemented in a fixed-point manner as follows:

$$S_{IQ} = \left\lfloor \frac{241}{2^8} \right\rfloor \times 2^{-\left(B+\frac{(n_1+n_2+3)}{2}-9\right)}$$

At step S250, the receiver transforms the scaled block into an image block, i.e. a block of luma or chroma samples, or a block of residuals. A block of luma or chroma samples may be obtained by adding a predictor, i.e. an array of prediction samples, to a block of residuals. The transform may be an IDCT transform (Inverse Discrete Cosine Transform). The transform of step S250 is the inverse transform applied on the encoder side at step S120.

The transform used is an inverse transform of the transform used at step S120 of the encoding method. Steps S210 to S250 may be iterated to encode all the blocks of an image. The method ends at step S280.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A decoding method comprising:
   decoding a block of transform coefficients from a bitstream;
   de-quantizing the decoded block of transform coefficients responsive to a quantization step size and a scaling factor to obtain a dequantized block; and
   transforming the dequantized block into an image block;
   wherein the scaling factor depends on whether at least one of the width and the height of the block is a power of 2;

wherein s1 is not a power of 2 and s2 is a power of 2 and the scaling factor $S_{IQ}$ is proportional to $$\sqrt{\frac{4}{3}} \times \frac{1}{\sqrt{s_1^* s_2}}$$

where s1 is the width and s2 the height of the block or vice versa and where $s_1^*$ is the smallest integer equal to a power of 2 that is greater than s1.

2. The decoding method according to claim 1, wherein the scaling factor $S_{IQ}$ is substantially equal to $$\sqrt{\frac{4}{3}} \times \frac{1}{\sqrt{s_1^* s_2}} \times 2^{-(B-9)}$$

where B is the bitdepth of the block.

3. The decoding method according to claim 1, wherein $s_1 = 3 \times 2^{n_1}$, $s_2 = 2^{n_2}$ and the scaling factor $S_{IQ}$ is substantially equal to $$\sqrt{\frac{4}{3}} \times 2^{-\left(B + \frac{(n_1 + 2 + n_2)}{2} - 9\right)}$$

in the case where $(n_1+2+n_2)\%2=0$, where % is the operator modulo and wherein, otherwise, the scaling factor $S_{IQ}$ is substantially equal to $$\sqrt{\frac{2}{3}} \times 2^{-\left(B + \frac{(n_1 + 2 + n_2 - 1)}{2} - 9\right)}$$

where $n_1$ is an integer and where $n_2$ is an integer.

4. A decoding method comprising:
decoding a block of transform coefficients from a bitstream;
de-quantizing the decoded block of transform coefficients responsive to a quantization step size and a scaling factor to obtain a dequantized block; and
transforming the dequantized block into an image block;
wherein the scaling factor depends on whether at least one of the width and the height of the block is a power of 2;
wherein neither s1 nor s2 is a power of 2 and $S_{IQ}$ is proportional to $$\frac{4}{3} \times \frac{1}{\sqrt{s_1^* s_2^*}}$$

where s1 is the width and s2 the height of the block or vice versa and where $s_1^*$ is the smallest integer equal to a power of 2 that is greater than s1 and where $s_2^*$ is the smallest integer equal to a power of 2 that is greater than s2.

5. The decoding method according to claim 4, wherein the scaling factor $S_{IQ}$ is substantially equal to $$\frac{4}{3} \times \frac{1}{\sqrt{s_1^* s_2^*}} \times 2^{-(B-9)}$$

where B is the bitdepth of the block.

6. The decoding method according to claim 4, wherein $s_1 = 3 \times 2^{n_1}$, $s_2 = 3 \times 2^{n_2}$ and the scaling factor $S_{IQ}$ is substantially equal to $$\frac{4}{3} \times 2^{-\left(B + \frac{(n_1 + n_2 + 4)}{2} - 9\right)}$$

in the case where $(n_1+2+n_2+2)\%2=0$, where % is the operator modulo and wherein, otherwise, the scaling factor $S_{IQ}$ is substantially equal to $$\frac{4}{3\sqrt{2}} \times 2^{-\left(B + \frac{(n_1 + n_2 + 3)}{2} - 9\right)}$$

where $n_1$ is an integer and where $n_2$ is an integer.

7. A coding method comprising:
transforming an image block into a block of transform coefficients;
quantizing the block of transform coefficients responsive to a quantization step size and a scaling factor to obtain a quantized block; and
encoding the quantized block into a bitstream;
wherein the scaling factor depends on whether at least one of the width and the height of the block is a power of 2;
wherein s1 is not a power of 2 and s2 is a power of 2 and the scaling factor $S_Q$ is proportional to $$\sqrt{\frac{3}{4}} \times \sqrt{s_1^* s_2}$$

where s1 is the width and s2 the height of the block or vice versa and where $s_1^*$ is the smallest integer equal to a power of 2 that is greater than s1.

8. The coding method according to claim 7, wherein the scaling factor $S_Q$ is substantially equal to $$\sqrt{\frac{3}{4}} \times \sqrt{s_1^* s_2} \times 2^{-(29-B)}$$

where B is the bitdepth of the image block.

9. The coding method according to claim 7, wherein $s_1 = 3 \times 2^{n_1}$, $s_2 = 2^{n_2}$ and the scaling factor $S_Q$ is substantially equal to $$\sqrt{\frac{3}{4}} \times 2^{-\left(29 - B - \frac{(n_1 + n_2 + 2)}{2}\right)}$$

in the case where $(n_1+2+n_2)\%2=0$, where % is the operator modulo and wherein, otherwise, the scaling factor $S_Q$ is substantially equal to $$\sqrt{\frac{3}{2}} \times 2^{-\left(29-B-\frac{(n_1+n_2+1)}{2}\right)}$$

where $n_1$ is an integer and where $n_2$ is an integer.

10. A coding method comprising:
transforming an image block into a block of transform coefficients;
quantizing the block of transform coefficients responsive to a quantization step size and a scaling factor to obtain a quantized block; and
encoding the quantized block into a bitstream;
wherein the scaling factor depends on whether at least one of the width and the height of the block is a power of 2;
wherein, in the case where neither s1 nor s2 is a power of 2, the scaling factor $S_Q$ is proportional to $$\sqrt[3]{4} \times \sqrt{s_1^* s_2^*}$$

where s1 is the width and s2 the height of the block or vice versa and where $s_1^*$ is the smallest integer equal to a power of 2 that is greater than s1 and where $s_2^*$ is the smallest integer equal to a power of 2 that is greater than s2.

11. The coding method according to claim 10, wherein the scaling factor $S_Q$ is substantially equal to $$\sqrt[3]{4} \times \sqrt{s_1^* s_2^*} \times 2^{-(29-B)}$$

where B is the bitdepth of the image block.

12. The coding method according to claim 10, wherein $s_1=3\times 2^{n_1}$, $s_2=3\times 2^{n_2}$ and the scaling factor $S_Q$ is substantially equal to $$\frac{3}{4} \times 2^{-\left(29-B-\frac{(n_1+n_2+4)}{2}\right)}$$

in the case where $(n_1+2+n_2+2)\%2=0$, where % is the operator modulo and wherein, otherwise, the scaling factor $S_Q$ is substantially equal to $$\frac{3\sqrt{2}}{4} \times 2^{-\left(29-B-\frac{(n_1+n_2+3)}{2}\right)}$$

where $n_1$ is an integer, and where $n_2$ is an integer.

13. A decoding device comprising a communication interface configured to access a bitstream and at least one processor, wherein the at least one processor is configured to perform:
decoding a block of transform coefficients from a bitstream;
de-quantizing the decoded block of transform coefficients responsive to a quantization step size and a scaling factor to obtain a dequantized block; and
transforming the dequantized block into an image block;
wherein the scaling factor depends on whether at least one of the width and the height of the block is a power of 2;
wherein s1 is not a power of 2 and s2 is a power of 2 and the scaling factor $S_{IQ}$ is proportional to $$\sqrt{\frac{4}{3}} \times \frac{1}{\sqrt{s_1^* s_2}}$$

where s1 is the width and s2 the height of the block or vice versa and where $s_1^*$ is the smallest integer equal to a power of 2 that is greater than s1.

14. The decoding device according to claim 13, wherein the scaling factor $S_{IQ}$ is substantially equal to $$\sqrt{\frac{4}{3}} \times \frac{1}{\sqrt{s_1^* s_2}} \times 2^{-(B-9)}$$

where B is the bitdepth of the block.

15. The decoding device according to claim 13, wherein $s_1=3\times 2^{n_1}$, $s_2=2^{n_2}$ and the scaling factor $S_{IQ}$ is substantially equal to $$\sqrt{\frac{4}{3}} \times 2^{-\left(B+\frac{(n_1+2+n_2)}{2}-9\right)}$$

in the case where $(n_1+2+n_2)\%2=0$, where % is the operator modulo and wherein, otherwise, the scaling factor $S_{IQ}$ is substantially equal to $$\sqrt{\frac{2}{3}} \times 2^{-\left(B+\frac{(n_1+2+n_2-1)}{2}-9\right)}$$

where $n_1$ is an integer and where $n_2$ is an integer.

16. A decoding device comprising a communication interface configured to access a bitstream and at least one processor, wherein the at least one processor is configured to perform:
decoding a block of transform coefficients from a bitstream;
de-quantizing the decoded block of transform coefficients responsive to a quantization step size and a scaling factor to obtain a dequantized block; and
transforming the dequantized block into an image block;
wherein the scaling factor depends on whether at least one of the width and the height of the block is a power of 2;
wherein neither s1 nor s2 is a power of 2 and $S_{IQ}$ is proportional to $$\frac{4}{3} \times \frac{1}{\sqrt{s_1^* s_2^*}}$$

where s1 is the width and s2 the height of the block or vice versa and where $s_1^*$ is the smallest integer equal to a power of 2 that is greater than s1 and where $s_2^*$ is the smallest integer equal to a power of 2 that is greater than s2.

17. The decoding device according to claim 16, wherein the scaling factor $S_{IQ}$ is substantially equal to $$\frac{4}{3} \times \frac{1}{\sqrt{s_1^* s_2^*}} \times 2^{-(B-9)}$$

where B is the bitdepth of the block.

18. The decoding device according to claim 16, wherein $s_1=3\times2^{n_1}$, $s_2=3\times2^{n_2}$ and the scaling factor $S_{IQ}$ is substantially equal to $$\frac{4}{3} \times 2^{-\left(B+\frac{(n_1+n_2+4)}{2}-9\right)}$$

in the case where $(n_1+2+n_2+2)\%2=0$, where % is the operator modulo and wherein, otherwise, the scaling factor $S_{IQ}$ is substantially equal to $$\frac{4}{3\sqrt{2}} \times 2^{-\left(B+\frac{(n_1+n_2+3)}{2}-9\right)}$$

where $n_1$ is an integer and where $n_2$ is an integer.

19. A coding device comprising a communication interface configured to access an image block and at least one processor, wherein the at least one processor is configured to perform:
 transforming an image block into a block of transform coefficients;
 quantizing the block of transform coefficients responsive to a quantization step size and a scaling factor to obtain a quantized block; and
 encoding the quantized block into a bitstream;
 wherein the scaling factor depends on whether at least one of the width and the height of the block is a power of 2;
 wherein s1 is not a power of 2 and s2 is a power of 2 and the scaling factor $S_Q$ is proportional to $$\sqrt{\frac{3}{4}} \times \sqrt{s_1^* s_2}$$

where s1 is the width and s2 the height of the block or vice versa and where $s_1^*$ is the smallest integer equal to a power of 2 that is greater than s1.

20. The coding device according to claim 19, wherein the scaling factor $S_Q$ is substantially equal to $$\sqrt{\frac{3}{4}} \times \sqrt{s_1^* s_2} \times 2^{-(29-B)}$$

where B is the bitdepth of the image block.

21. The coding device according to claim 19, wherein $s_1=3\times2^{n_1}$, $s_2=2^{n_2}$ and the scaling factor $S_Q$ is substantially equal to $$\sqrt{\frac{3}{4}} \times 2^{-\left(29-B-\frac{(n_1+n_2+2)}{2}\right)}$$

in the case where $(n_1+2+n_2)\%2=0$, where % is the operator modulo and wherein, otherwise, the scaling factor $S_Q$ is substantially equal to $$\sqrt{\frac{3}{2}} \times 2^{-\left(29-B-\frac{(n_1+n_2+1)}{2}\right)}$$

where $n_1$ is an integer and where $n_2$ is an integer.

22. A coding device comprising a communication interface configured to access an image block and at least one processor, wherein the at least one processor is configured to perform:
 transforming an image block into a block of transform coefficients;
 quantizing the block of transform coefficients responsive to a quantization step size and a scaling factor to obtain a quantized block; and
 encoding the quantized block into a bitstream;
 wherein the scaling factor depends on whether at least one of the width and the height of the block is a power of 2;
 wherein, in the case where neither s1 nor s2 is a power of 2, the scaling factor $S_Q$ is proportional to $$\tfrac{3}{4} \times \sqrt{s_1^* s_2^*}$$

where s1 is the width and s2 the height of the block or vice versa and where $s_1^*$ is the smallest integer equal to a power of 2 that is greater than s1 and where $s_2^*$ is the smallest integer equal to a power of 2 that is greater than s2.

23. The coding device according to claim 22, wherein the scaling factor $S_Q$ is substantially equal to $$\tfrac{3}{4} \times \sqrt{s_1^* s_2^*} \times 2^{-(29-B)}$$

where B is the bitdepth of the image block.

24. The coding device according to claim 22, wherein $s_1=3\times2^{n_1}$, $s_2=3\times2^{n_2}$ and the scaling factor $S_Q$ is substantially equal to $$\frac{3}{4} \times 2^{-\left(29-B-\frac{(n_1+n_2+4)}{2}\right)}$$

in the case where $(n_1+2+n_2+2)\%2=0$, where % is the operator modulo and wherein, otherwise, the scaling factor $S_Q$ is substantially equal to $$\frac{3\sqrt{2}}{4} \times 2^{-\left(29-B-\frac{(n_1+n_2+3)}{2}\right)}$$

where $n_1$ is an integer and where $n_2$ is an integer.

* * * * *